(12) United States Patent  
Ozanne

(10) Patent No.: US 8,512,886 B2  
(45) Date of Patent: *Aug. 20, 2013

(54) CAPSULE FOR BREWING A BEVERAGE

(75) Inventor: Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 894 days.

This patent is subject to a terminal disclaimer.

(21) Appl. No.: 12/438,867

(22) PCT Filed: Aug. 29, 2007

(86) PCT No.: PCT/EP2007/058967  
§ 371 (c)(1),  
(2), (4) Date: Feb. 25, 2009

(87) PCT Pub. No.: WO2008/025785  
PCT Pub. Date: Mar. 6, 2008

(65) Prior Publication Data  
US 2009/0320693 A1    Dec. 31, 2009

(30) Foreign Application Priority Data

Aug. 30, 2006  (EP) .................................. 06119796  
Aug. 30, 2006  (EP) .................................. 06119800  
Apr. 13, 2007  (EP) .................................. 07007651

(51) Int. Cl.  
*B65B 29/02*   (2006.01)

(52) U.S. Cl.  
USPC ........................................................ 429/79

(58) Field of Classification Search  
None  
See application file for complete search history.

(56) References Cited

U.S. PATENT DOCUMENTS

| 7,487,713 | B2 * | 2/2009 | Magno ..................... 99/302 P |
| 7,543,527 | B2 * | 6/2009 | Schmed ....................... 99/295 |
| 7,581,658 | B2 * | 9/2009 | Mosconi et al. .............. 221/161 |
| 7,981,451 | B2 * | 7/2011 | Ozanne ......................... 426/79 |
| 7,987,767 | B2 * | 8/2011 | Hester et al. ................. 99/280 |
| 2003/0172813 | A1 | 9/2003 | Schifferle |
| 2010/0003371 | A1 * | 1/2010 | Ozanne et al. ................. 426/77 |

FOREIGN PATENT DOCUMENTS

| EP | 1529469 | 5/2005 |
| EP | 1574452 | 9/2005 |
| EP | 1580144 | 9/2005 |

(Continued)

OTHER PUBLICATIONS

International Search Report for International Application No. PCT/EP2007/058967 mailed Feb. 18, 2008.

(Continued)

*Primary Examiner* — Kurt Fernstrom  
*Assistant Examiner* — Dolores Collins  
(74) *Attorney, Agent, or Firm* — K&L Gates LLP

(57) ABSTRACT

The capsule (2) for the preparation of a beverage in a beverage machine comprises: a brewing enclosure (20) containing one or more beverage ingredients; filtering means (22) delimiting at least one filtering side of the brewing enclosure, beverage flow guiding means (40) configured to guide the beverage to a beverage outlet (41b) of the capsule, a shell (21) and a protective cover (4) that is attached to the shell and forms with the shell a gas tight container for the beverage ingredients; The capsule further comprises opening means comprising an opening element (43) arranged outside the brewing enclosure and configured to open the gas-tight container in order to create the beverage outlet (41b), said gas tight container integrally housing the beverage flow guiding means (40) and the opening element (43).

22 Claims, 7 Drawing Sheets

(56) References Cited

FOREIGN PATENT DOCUMENTS

| | | |
|---|---|---|
| GB | 1215840 | 12/1970 |
| GB | 1256247 | 12/1971 |
| WO | WO0042891 | 7/2000 |
| WO | WO 2005/066040 A2 * | 7/2005 |

OTHER PUBLICATIONS

Written Opinion for International Application No. PCT/EP2007/058967 mailed Feb. 18, 2008.

* cited by examiner

CAPSULE FOR BREWING A BEVERAGE

The present invention relates to a capsule for preparing and delivering a beverage in a brewing device. The present invention more particularly aims at providing a capsule adapted to deliver brewed tea although other beverages can be successfully brewed in the capsule.

Quality of a tea beverage is highly dependent on the quality of the leaf tea ingredients, i.e., the tea origin used (soil, drying, blending, etc.) and their storage conditions. For instance, tea ingredients are usually sensitive to oxygen and light. Preferred tea ingredients are taken from loose leaves, chiselled or broken into small fragments. However, brewing conditions are also important to take full advantage of the quality of the ingredients used.

Different beverage capsules for brewing beverages in a suitable beverage machine are known. However, according to the prior art, an external piercing member, which is part of the beverage machine, is usually used to create an outlet from the cartridge. This operation amounts to undesirable physical interaction between the beverage and the machine parts. In particular, cross-contamination may occur when two different cartridges are sequentially brewed without cleaning the machine. Taste cross-contamination happens when a taste residue is left by a first capsule on permanent parts of the machine that can consequently affect the taste of a second capsule which is brewed just after the first capsule. For tea, this can be an issue with certain tea varieties that deliver a high aroma profile such as mint tea or other highly flavoured varieties. Also tea residue may constitute a soil for bacterial growth and may lead to hygiene issues which need to be tackled.

Therefore, the present invention aims at proposing a design for a capsule that enables to maintain freshness of the ingredients, promotes optimal conditions for the preparation of a tea beverage and the like, and reduces the cross-contamination problems.

In the present application, the terms "capsule" or "cartridge" or "package" are considered as synonymous. The term "capsule" will be preferentially used. The words "brewing" or "infusion" are used as synonymous. The term "brewing fluid" generally refers to the liquid that serves to infuse the beverage ingredients, more generally, hot water.

In the present application, the term "tea" encompasses all type of leaf tea such as green tea, black tea, white tea, chai tea, flavoured tea and herbal or fruit tea. The term "leaf tea" or "leaf ingredient" refers to brewable tea or other ingredients in whatever form such as complete, cut or chiselled leaves, small fragments of leaves, powder or dust.

According to a first aspect of the present invention, a capsule is provided that is adapted to brew or infuse beverages in a beverage machine that may provide the following advantages:
- the capsule is less complicated and less expensive to produce,
- the beverage delivery is cleaner and it reduces or eliminates the taste cross-contamination and hygiene issues,
- the convenience of the capsule handling, i.e., insertion and collection of the used capsules can be improved.

For these purposes as well as many possible others, the invention relates to a capsule for the preparation of a beverage in a beverage machine comprising:
a brewing enclosure containing one or more beverage ingredients;
filtering means delimiting at least one filtering side of the brewing enclosure,
beverage flow guiding means configured to guide the beverage to a beverage outlet of the capsule,
a shell and a protective cover that is attached to the shell and forms with the shell a gas tight container for the beverage ingredients;
wherein
the capsule comprises an opening element arranged outside the brewing enclosure and configured to open the gas-tight container in order to create the beverage outlet, said gas tight container integrally housing the beverage flow guiding means and the opening element.

Therefore, according to one aspect of the invention, the opening element and the flow guiding means are a part of the capsule itself. This feature practically eliminates all physical interaction between the beverage and the machine parts. An advantage of this arrangement is that it avoids cross-contamination and results in less cleaning.

The capsule can comprise an overflow wall positioned in the in the path of the brewed liquid after the filtering means, the overflow wall comprising at least one overflow aperture. The overflow wall and the cover can further face each other, and at least a portion of the side of the overflow wall facing the cover can be configured to support the cover.

An advantage of this arrangement is that it promotes a more "direct flow" approach with less chance of the brewed liquid to contaminate parts of the brewing device while ensuring, at the same time, that the liquid fills the brewing enclosure completely during brewing so that the ingredients are properly infused and product concentration in the cup is properly controlled.

The opening element can further be arranged flush with the portion of the side of the overflow wall that supports the cover, until the gas tight container is opened.

The beverage flow guiding means can comprise a beverage flow channel arranged on the side of the overflow wall that faces the cover and for connecting at least one overflow aperture with the beverage outlet. A groove can further be formed in the side of the overflow wall facing the cover. This groove can be configured to house the opening element, and a downstream portion, at least, of the beverage flow channel joining with said groove. The side of the overflow wall facing the enclosure can further feature a raised portion, which corresponds to a recessed portion of the side of the overflow wall facing the cover. This recessed portion can form at least part of the groove.

An upstream portion of the beverage channel can further be separate from said groove, and it can be configured so as to avoid contact between the beverage and one end of the opening element.

The filtering means can comprise a plurality of studs protruding from the side of the overflow wall facing the enclosure. Alternatively, the filtering means can comprise a paper filter arranged between the overflow wall and the enclosure. The paper filter and the studs can possibly be combined.

The opening element can be a perforating element for perforating an outlet in a wall of the gas-tight container or an element adapted to create an outlet by breaking a joint between two parts of the container. The perforating element can further have a generally elongated shape with two opposing ends. The perforating element can be configured to be pushed from a starting position to an "in use" position when mechanical pressure is applied onto a first opposing end, the second opposing end being configured to pierce, go through or de-seal the protective cover when the perforating element is pushed into the "in use" position. The first opposing end can further be configured to be pushed by an external mechanical pusher. A portion of the cover, between the mechanical pusher and the first opposing end, can be configured to be pierced by the mechanical pusher.

A shoulder can further be formed in the first opposing end of the perforating element, so that when the mechanical pusher is activated, it can apply pressure onto the shoulder. The perforating element can further be configured to function like a ram, pressure applied onto the first opposing end causing the perforating element to slide longitudinally into the "in use" position. The second opposing end of the perforating element can further carry a piercing point that faces a perforable zone of the cover when the perforating element is in the starting position. In the "in use" position of the perforating element, the piercing point can further extend below the lowermost part of the capsule.

A second aspect of the present invention relates to a beverage machine comprising a device designed for brewing a beverage on the basis of ingredients contained in a capsule, this beverage brewing device comprising:
  means for retaining the capsule in a defined position,
  first opening means for opening a hot water inlet into the capsule while the capsule is retained in the defined position,
  second opening means for opening a beverage outlet from the capsule while the capsule is retained in the defined position,
  wherein the retaining means and the first and second opening means are controlled by a common actuator.

According to this second aspect, the second opening means can further comprise a mechanical pusher arranged above the defined position of the capsule and designed to slide downwards when actuated, so as to manoeuvre an opening element integrally housed inside the capsule.

The beverage machine can further be designed in such a way that, in the defined position, the beverage outlet of the capsule protrudes from an underside of the brewing device so that brewed liquid does not encounter any permanent part when flowing down from the beverage outlet.

An advantage of this arrangement is that the brewed liquid can be delivered vertically and smoothly from the capsule into the cup; this minimizes the formation of turbulence or foam and generally provides for a clean and elegant delivery.

An embodiment of the present invention will now be described, by way of example only, with reference to the accompanying drawings, in which.

Figure 1:
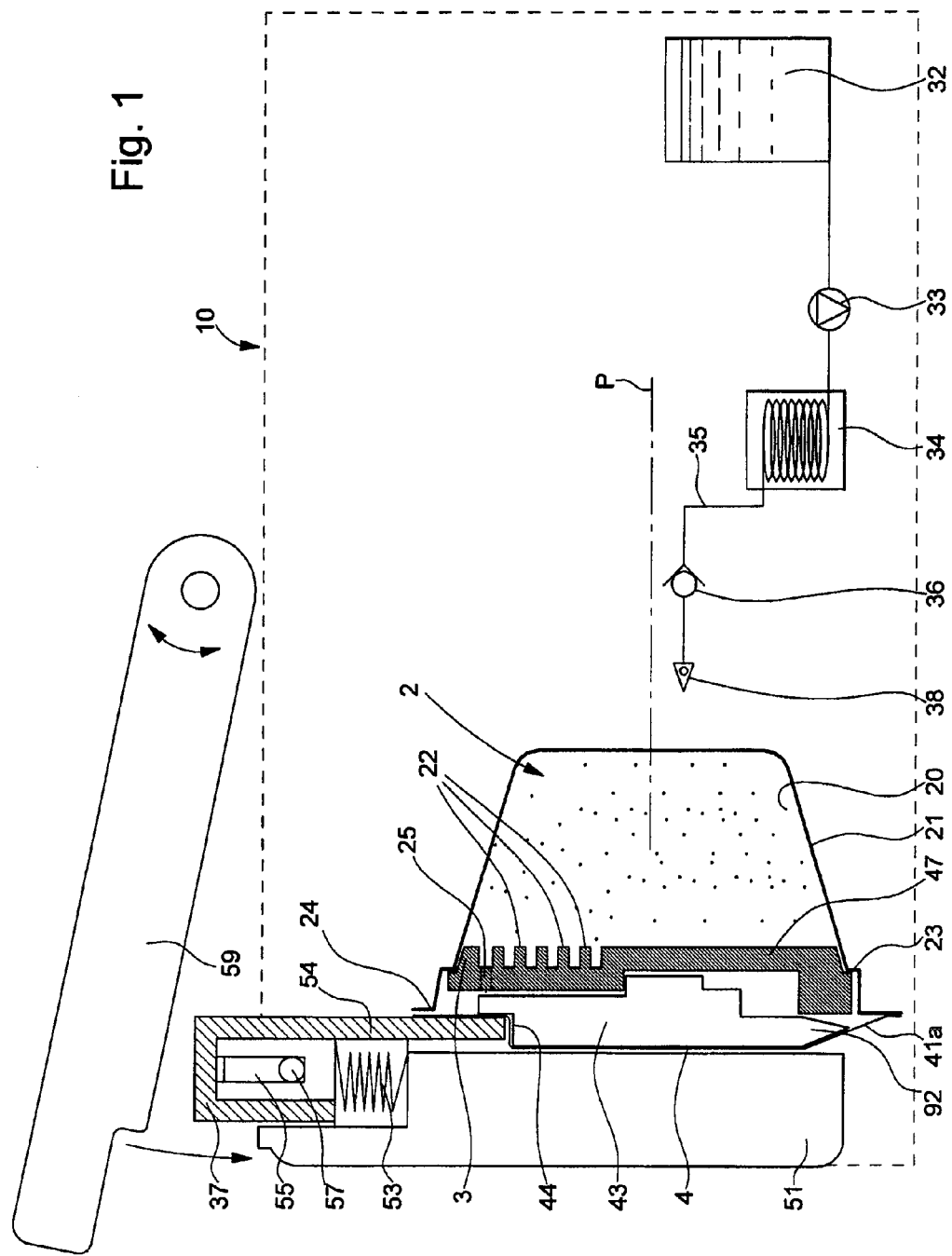
FIG. 1 is a schematic illustration of both a capsule according to one particular embodiment of the present invention and a brewing device for the capsule, shown before brewing.
Figure 2:
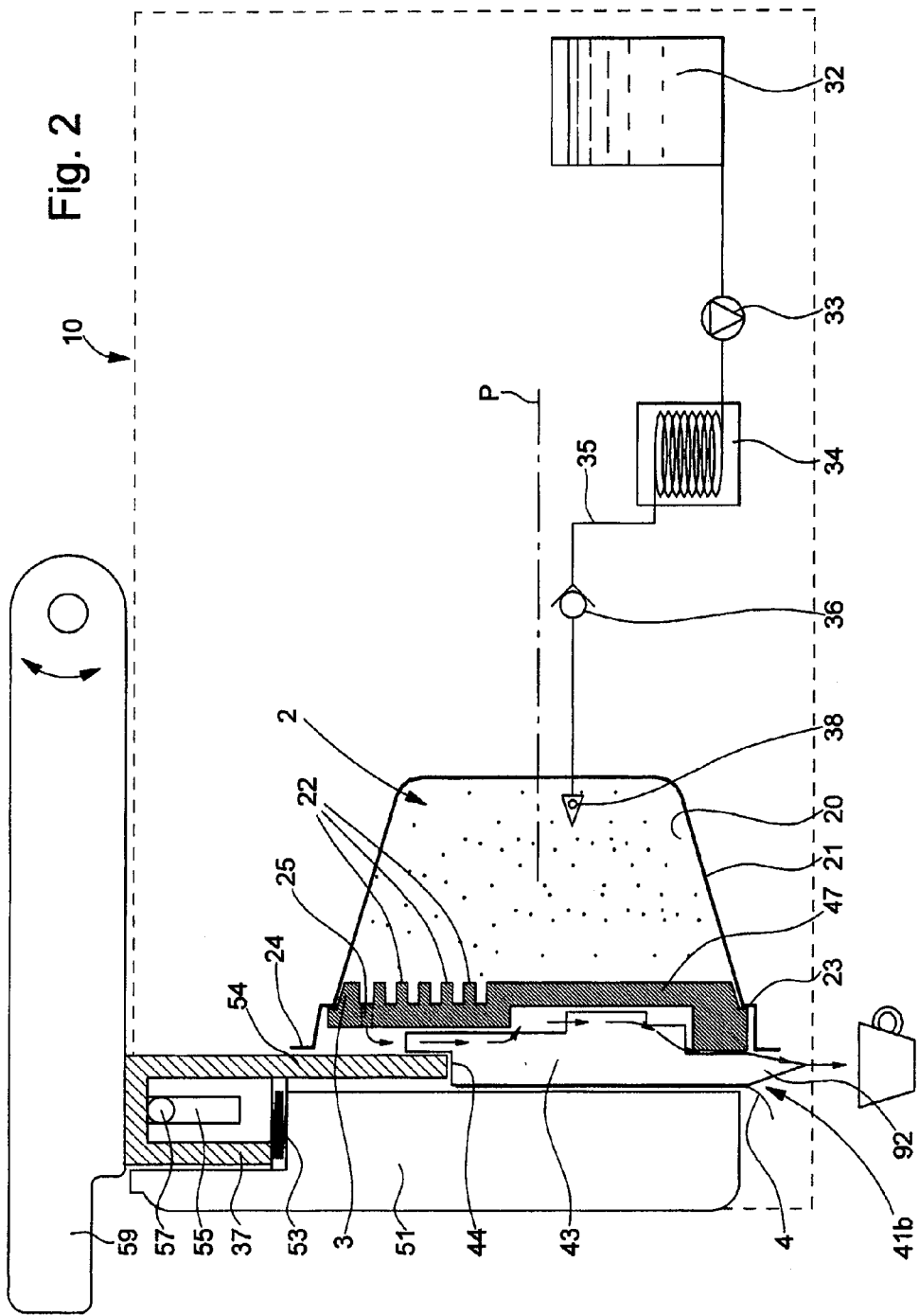
FIG. 2 is a schematic illustration of the capsule and the brewing device of FIG. 1, shown during brewing of the capsule.

First of all, the general brewing principle of the invention will be explained in relation to FIGS. 1 and 2.

Figure 3:
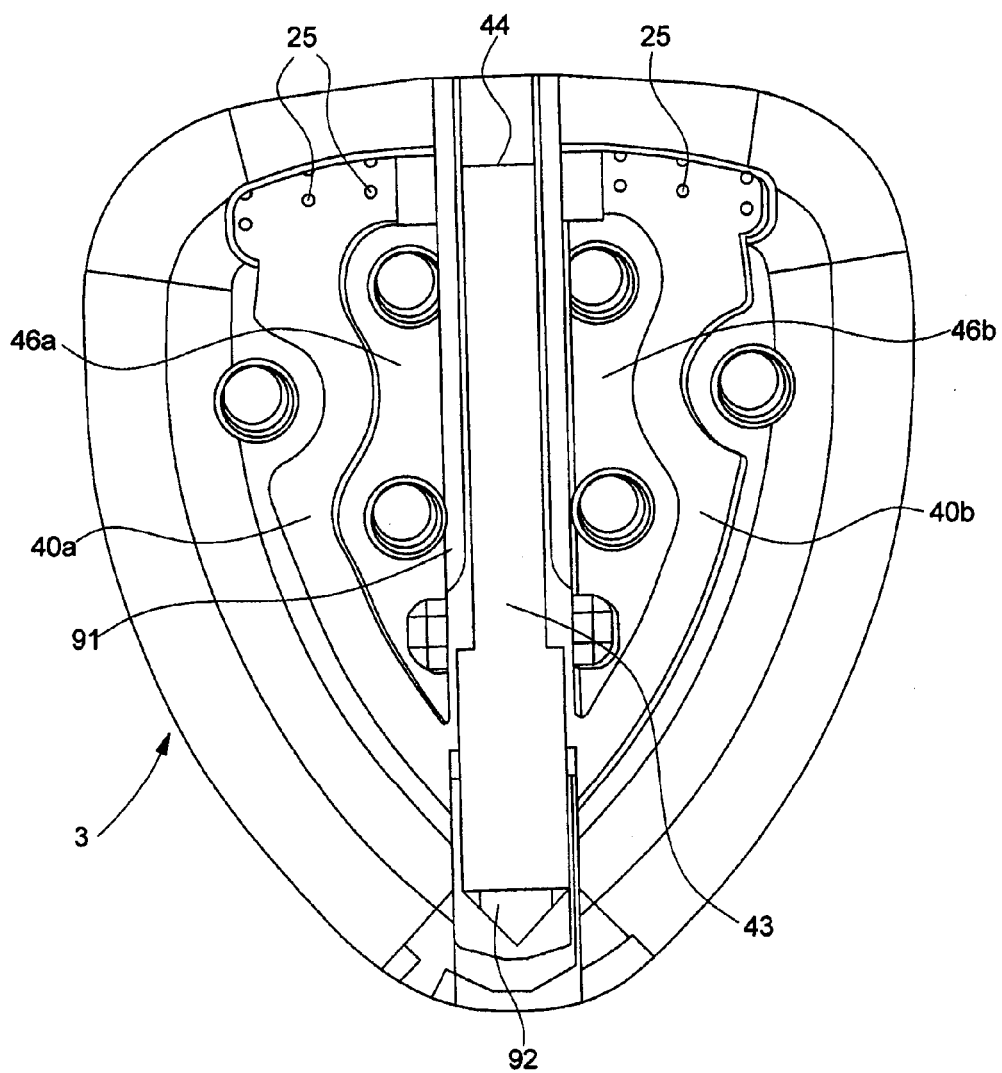
FIG. 3 is a plane view showing the overflow wall of the capsule of FIG. 1, viewed from the cover side, so as to show the perforating element in "starting" position.
Figure 4:
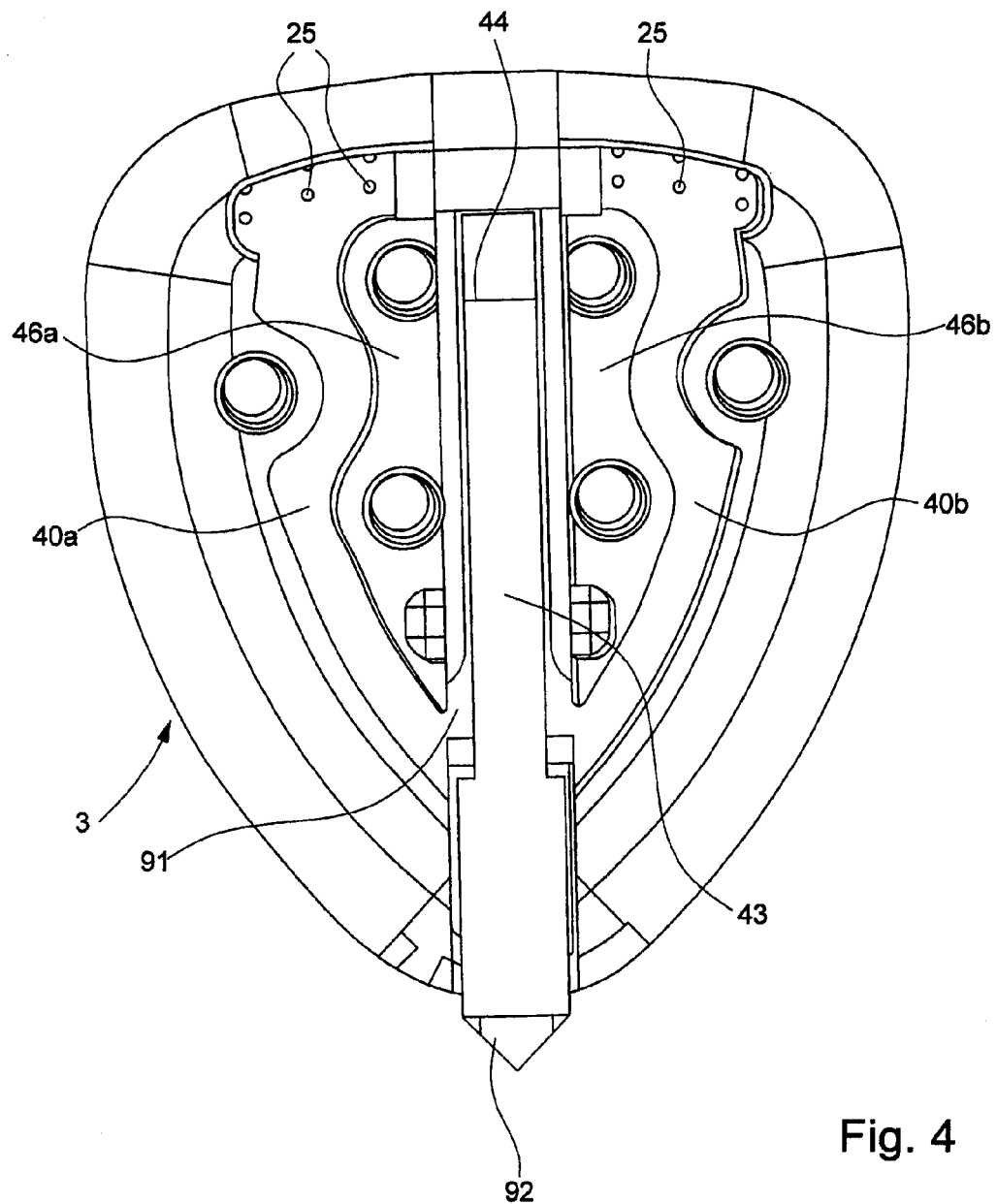
FIG. 4 is a plane view similar to FIG. 3 showing the perforating element in "in-use" position.
Figure 5:
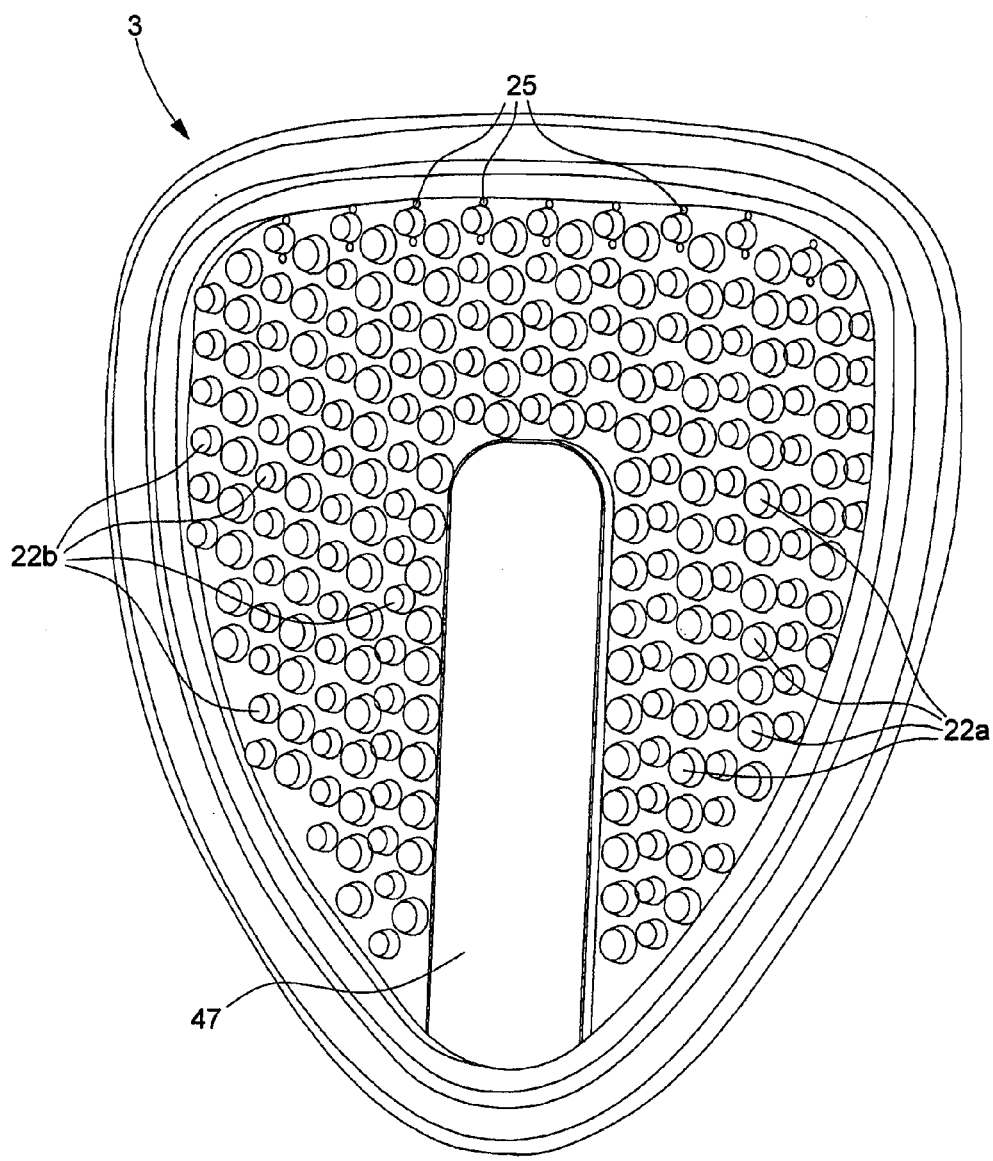
FIG. 5 is a plane view showing the overflow wall of the capsule of FIG. 1, viewed from the filtering side.

A capsule system is provided that comprises a capsule 2 and a beverage brewing device 10. For simplicity, the beverage brewing device is only schematically depicted and may, in reality, comprise additional technical features within the normal knowledge of the person skilled in the art. The capsule comprises an enclosure 20 containing beverage ingredients such as leaf tea and the like. The enclosure is formed by a cup-shaped housing 21 that is closed by an overflow wall or plate 3. The content of the enclosure is preferably protected from gas and light. The housing may have different cross-sections such as a circular, ellipsoid, square, rectangular or polygonal, and this cross-section determines the general outline of the flat overflow wall 3. As can be seen in FIGS. 3 to 5, the cross-section of the capsule is preferably chosen so as to indicate naturally to a user the proper direction for insertion of the capsule 2 into the brewing device 10. Therefore, the outline of the cover 2, as well as that of the overflow wall 3 preferably does not show rotational symmetry. The outline of the cover can, for instance, be egg-shaped or shield-shaped with broad topside and a more pointed bottom side.

The enclosure is sized to accommodate a dose of leaf beverage ingredient of typically about between 1 to 10 grams, preferably 2 to 5 grams. The dose of leaf ingredient may depend on the final volume of beverage to produce. For an individual cup of tea, a typical dose can be of about 2 grams whereas for a tea pot, a typical dose can be of about 8 to 10 grams. As clearly apparent in FIG. 1, the capsule is positioned relative to the brewing device so that the overflow wall 3 extends substantially vertical and from substantially the bottom of the enclosure. For this, the capsule is preferably positioned in a "vertical" orientation in the brewing device 10. The cup-shaped housing 21 can be so oriented with its large opening and its bottom oriented in a vertical position.

The overflow wall 3 further comprises at least one (preferably several) overflow apertures 25. The overflow apertures are placed at least above the ¾ of the height of the enclosure. The overflow wall is maintained in place by a peripheral inner shoulder 23 of the housing 21. The side of the overflow wall or plate 3 facing the enclosure carries filtering means. According to the present particular embodiment, the filtering means consist of an arrangement of roughly parallel studs 22 protruding from the side of the overflow wall. As is shown in FIG. 5, the studs are relatively closely spaced and form a regular lattice. More specifically, the studs 22 should be arranged closely enough to enable the lattice to function as a filter and keep the majority of the solid particles contained in the brewed beverage from leaving the enclosure. The adequate distance between neighbouring studs will depend on the size of the food fragments that are brewed. Typically, this distance is in the range between 0.5 and 5 mm. The studs 22 are preferably made integral with the overflow wall 3. The overflow wall and the studs can be made from plastic by injection moulding or by any other appropriate technique known to the person skilled in the art. FIG. 5 shows that the arrangement of studs comprises both broad studs 22a and narrow studs 22b. The diameter of the broad studs lies in between about 0.5 and 3 mm. and diameter of the narrow studs lies in between about 0.5 and 2 mm. Every broad stud has a narrow stud for closest neighbour and vice versa. In FIG. 5, the pattern formed by a pair of neighbouring studs, one broad and one narrow, repeats itself regularly, and one can further observe that the studs form rows across the surface of the overflow wall 3.

The capsule is closed by a cover 4 that hermetically seals the cup-shaped housing 21. This cover is attached to the peripheral outer rim 24 of the housing. The cover can be attached to the peripheral rim by gluing or welding, or any other appropriate technique known to a person skilled in the art. Both the cover and the housing can be made of oxygen barrier materials so as to form an oxygen tight container. In this way, the enclosure 20 can be substantially free of oxygen so that the freshness of the beverage ingredients can be preserved during an extended period of time. The enclosure may contain flushed inert gas such as N2, N2O or CO2. The cover 4 can be a flexible membrane or a semi-rigid plastic part. Suitable materials include, but are not limited to, plastics, PET, aluminium foil, polymeric film, paper, and the like.

As shown in FIGS. 3 and 4, in the present example, two lateral channels 40a and 40b run along the side of the wall 3 that faces the cover 4. The channels extend from the overflow apertures 25 to a location where the lateral channels join near the lowermost part of the overflow and support wall 3. The side of the overflow wall 3 facing the cover further comprises a vertical groove 91 housing a perforating element 43 that extends along the groove and can be manoeuvred from outside the capsule. As depicted, the peripheral channels 40a and 40b are in a symmetrical arrangement in relation to groove 91. FIGS. 3 and 4 further show that the channels 40a et 40b are separated from the central groove 91 by two prominent zones referenced 46a and 46b. This arrangement allows the brewed liquid to be kept from the rear end of the perforating element 43. Prominent zones 46a and 46b extend at least as far out from the overflow wall as the perforating element 43. Preferably, the faces of zones 46a and 46b are flush with the perforating element 43. The two prominent zones form walls on either side of the groove 91 and serve as lateral guiding means for the mobile perforating element 43. Zones 46a and 46b further play the role of supporting pillars for the protective cover 4.

The channels 40a and 40b are intended to guide beverage from the overflow apertures 25 to a tearable or pierceable zone 41a of the cover. The zone 41a is located near the lowermost part of the cover 4 and it also faces the lower end of the groove 91. The zone 41a is intended to be torn or pierced by the perforating element 43 in order to create a beverage outlet from the capsule. Alternatively, the tearable or pierceable zone can be replaced by a detachable zone of the cover that can be separated from the outer rim 24 of the housing 21.

In the present embodiment, the groove 91, which houses the perforating element, is considerably deeper than the channels 40a and 40b. As can be understood from FIGS. 1 and 2, the deepest section of the groove 91 is arranged in a recessed portion of the overflow wall 3. In the present example, if the side of the overflow wall facing the brewing enclosure was completely planar, the thickness of the overflow would not be sufficient to accommodate the groove 91. Therefore, in order to provide space for the groove 91, the part of the overflow wall 3 opposite the deepest section of the groove 91 features a raised or prominent portion 47. In the present embodiment, the raised portion 47 (also shown in FIG. 5) extends approximately as far as the tips of the studs 22 forming the filtering means. The particular arrangement which has just been described has the advantage of being more compact than would an arrangement where the side of the overflow wall facing the enclosure was entirely planar.

The perforating element 43 can have the general shape of an elongated beam. In the present embodiment, the perforating element extends along practically the full length of the groove 91. A shoulder 44 is formed near the rear of the perforating element 43. When pressure is applied from the top onto the shoulder 44, the perforating element can slide downward along the groove 91. The downward pressure is preferably applied by an external mechanical pusher 37, which is part of the beverage machine. The front end of the perforating element 43 carries a piercing point 92, which is arranged so as to come into contact with the cover and to puncture it when the perforating element 43 is pushed down the groove 91. In this way, a beverage outlet 41b is created in the cover 4.

The shape of the shell of the capsule is not very critical. For different reasons, preference is given to a truncated cone, or to ellipsoidal or hemispherical shapes. The shell can be manufactured industrially at lower cost by plastic thermoforming or aluminium deep drawing. This shape with smoother corners also favours the removal of the handling means, so as to allow the ejection of the capsule.

Turning to the brewing device 10, it comprises capsule handling means comprising a fixed front plate 51 and a movable part (not shown). The movable part is arranged to press the cover side of the capsule 2 against the front plate, in order to immobilize the capsule and hold it in the "vertical" orientation, as defined (FIGS. 1 and 2). The movable part can comprise machine jaws or any suitable mechanical enclosing means that can open and close about the capsule and can maintain it firmly in place. There is no need for providing high closing force since the fluid pressure in the capsule remains relatively low and, preferably, as close as possible to the atmospheric pressure. Besides, the capsule itself can withstand the low brewing pressure. Therefore, the capsule does not necessarily need to be entirely enclosed but simply held water-tightly in place during brewing. This contributes to a simplification of the machine and reduces machine costs.

The brewing device comprises a water supply 32, such as a water tank, a water pump 33, a heater 34 and a hot water injection line 35 that is associated with the movable part of the handling means. The brewing device may also comprise a controller and a user interface board (not shown) to manage the beverage preparation cycles as known in the art. A backpressure valve 36 can be provided to lower the pressure at the entry side of an injection member 38. This injection member is designed to go through shell 2 of the capsule in order to serve as a water inlet. The injection member 38 can be a needle(s) or blade(s) or any other appropriate device. Of course, the backpressure valve could be omitted and a low pressure pump could be used that delivers fluid at low pressure. A medium to high pressure pump may however be preferred because of its robustness and reliability and so be used in combination with a backpressure valve.

The brewing device further comprises a mechanical pusher 37 that, in association with the perforating element 43, forms perforation means, which are provided for creating an outlet near the lowermost part of the cover 4. The mechanical pusher 37 is arranged so as to be able to slide up and down in an opening formed in the uppermost part of the fixed front plate 51 of the brewing device. The mechanical pusher comprises a rod 54 that extends downwards from the body of the pusher. The body of the pusher 37 is supported by a spring 53 arranged between the lower side of the body and a shoulder of the front plate. The body of the mechanical pusher further comprises a vertical slot 55 arranged to receive a horizontal stop 57. When the mechanical pusher is in its rest position (FIG. 1), the spring 53 pushes the bottom end of the slot 55 against the stop 57. When the pusher is in its active position (FIG. 2), the top end of the slot abuts against the stop.

In the present example, the perforation means further comprise a lever arm 59. This lever arm is arranged to come into contact with the top side of the mechanical pusher 37, whenever the lever is lowered. As depicted in FIG. 2, by lowering the lever arm 59 completely, a user of the capsule system 1 drives the mechanical pusher into its active position. It should be understood that, in an alternative embodiment, the mechanical pusher could be driven into its active position automatically, by means of a solenoid or any other equivalent driving means.

The mechanical pusher is used to manoeuvre the perforating element 43. When the mechanical pusher 37 moves from it's rest position to its active position, the mechanical pusher 37 cuts through the upper part of the cover 4 and comes directly into contact with the shoulder 44 formed near the rear-end of the perforating element 43. In an alternative embodiment, instead of piercing the cover, the mechanical pusher 37 could press against a deformable zone of the upper part of the cover 4, in order to force this zone against the shoulder 44. As previously described, mechanical pressure, applied directly or indirectly, by the pusher 37, onto the shoulder 44, causes the perforating element to slide along the groove 91 so as to bring about the opening of a beverage outlet 41b near the lowermost part of the cover 4.

In an alternative embodiment, it would be possible to dispense with the shoulder 44 and have the mechanical pusher 37 simply press against the rear end of the perforating element 43. However, as shown in FIG. 2, one advantage of having the shoulder 44 is that when the rod 54 of the mechanical pusher 37 comes into contact with the shoulder 44, the rear end of the perforating element is held down against the overflow wall 3 by the side of the rod. This advantageous feature ensures that the perforating element is properly guided during its travel down groove 91.

Once the mechanical pusher 37 has caused the piercing element 43 to complete its downward travel, the pusher 37 can either retract out of the capsule or stay in its active position. However, the perforating element 43 preferably remains in the "in use" position depicted in FIGS. 2 and 4. In this position, the piercing point 92 extends out of the beverage outlet 41b. The piercing point 92 preferably extends below the lowermost part of the capsule. In this way, the piercing point 92 can function as beverage guide, along which the fluid coming out of the beverage outlet can run down until it falls straight into a cup. In this configuration, surface tension naturally causes the beverage to run along the length of the surface of the piercing point 92, thus avoiding turbulence and foam, and providing for a clean and elegant flow from the capsule directly into the cup.

The mechanical pusher 37 can be activated either during or after (preferably during) the closing of the capsule handling means about the capsule. However, it should be understood that according to the invention, the mechanical pusher could also be dispensed with. In this case, the perforating element 43 would be manoeuvred manually preferably before fitting the capsule 2 into the beverage brewing device 10.

Figure 6A:
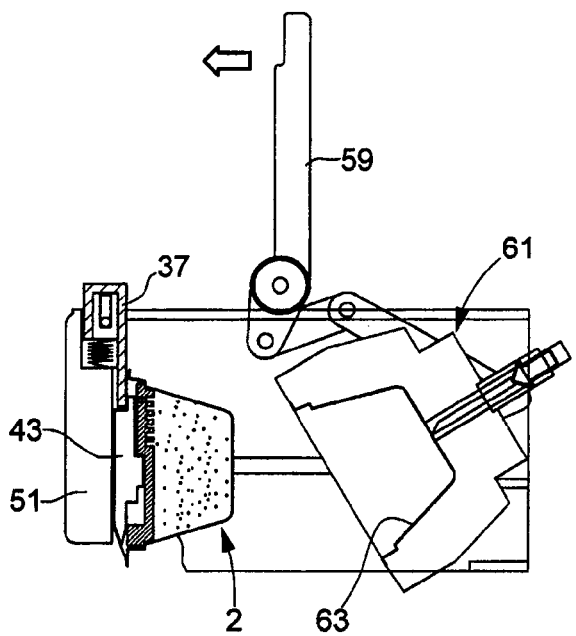
FIGS. 6A to 6E depict the operation of a particular embodiment of a beverage brewing device adapted for using the capsule of the present invention.
Figure 6B:
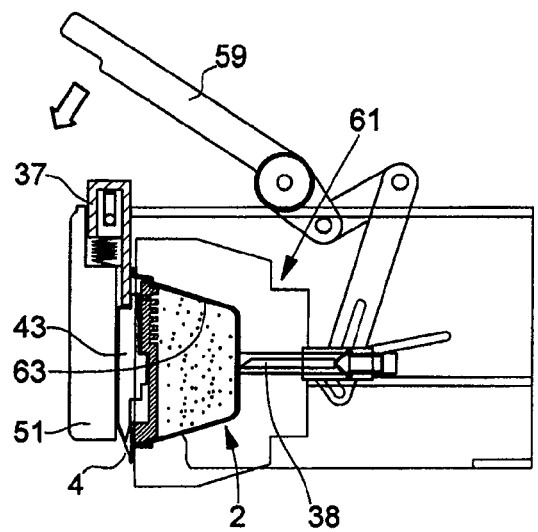

FIGS. 6A to 6E depict the operation of a particular embodiment of a beverage brewing device adapted for using the above described capsule. A particular implementation of the method of the invention will now be described in relation to FIGS. 6A to 6E as well as FIG. 2. A user first inserts a capsule manually into an opening in the top of the brewing device. In so doing, the user holds the capsule in the above mentioned "vertical" orientation. The capsule then drops through the vertical opening, until it reaches a pre-fixation position in which it is held by pre-fixation means (not shown). For example, the pre-fixation means can be a pair of flexible arms. These arms hold the capsule in the position schematically depicted in FIG. 6A. In this position, the capsule is held at a small distance from, and facing, the front plate 51. At this stage, the movable part 61 of the capsule handling means is sitting clear of the front plate 51 in what corresponds to the movable part's "open" position. As shown in FIG. 6A, at this stage, the movable part is slightly rotated relative to the horizontal plane, as will be explained in further details later on.

The movable part 61 comprises a hollow opening 63 whose shape is designed to match the contour of the shell 21 of the capsule. The movable part is connected to a manually operable lever arm 59. When a user operates the lever arm, the movable part 61 first moves into the position depicted in FIG. 6B. In this intermediate position, the movable part and the front plate 51 have practically engaged each other. Furthermore, the shell 21 of the capsule 2 is now held in the hollow opening 63 of the movable part. The flexible arms that held the capsule during the first stage are now useless, and they are pushed aside by the advancing movable part 61, in such a way that the flexible arms disengage from the capsule.

Figure 6C:
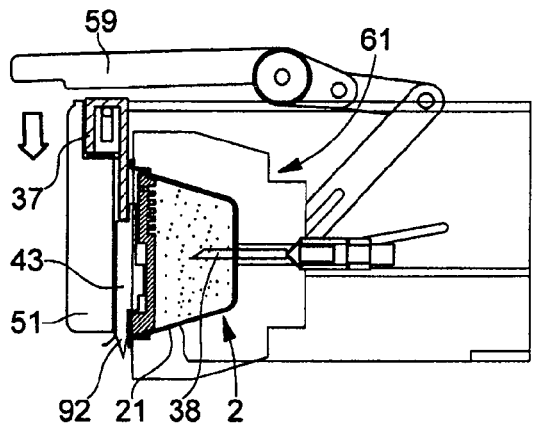

Before brewing begins, both a water inlet and a beverage outlet are opened in the capsule. As previously explained, a hot water injection line 35 (shown in FIGS. 1 and 2) and an injection member 38 are associated with the movable part 61. The lever arm 59 is designed to control both the closing of the movable part and the displacements of the injection member 38. When the user lowers the lever arm completely, the movable part presses the capsule against the front plate 51. A the same time, the fluid injection member 38 moves from its previous retracted position to a protruding position as depicted in FIG. 6C. The forward movement of the fluid injection member 38 causes it to go through the capsule's shell 21. Capsules made of plastic material are difficult to pierce. However, the sides of the hollow opening 63 give additional support to the shell of the capsule, making it less likely that the plastic wall will deflect when engaged by the injection member. When the lever arm nears its lowermost position (FIG. 6C), the injection line 35 begins supplying hot water. The hot water flows into the capsule through the injection member 38. The hot water is injected at relatively low pressure, preferably, at a pressure not exceeding 1 bar, even preferably 0.2 bar, above atmospheric pressure. Hot water slowly fills the enclosure and submerges the beverage ingredients contained in it. The beverage is filtered by passing through the filtering means 22 at different vertical levels up to the upper level of the fluid in the enclosure.

As previously explained, lowering the lever arm 59 completely, additionally activates the mechanical pusher 37. Therefore, as water begins to flow into the enclosure, the pusher 37 causes the perforating element 43 to slide downwards under the cover 4, so as to bring about the opening of a beverage outlet 41b near the lowermost part of the cover of the capsule. In this way, the brewed liquid can be evacuated from the enclosure 20 through the overflow apertures 25 and along the beverage guiding means, so as to finally leave the capsule through the beverage outlet 41b. One will understand that according to this particular embodiment, the mechanical pusher 37 is activated during and near the end of the closing movement of the capsule handling means.

The beverage coming out of the overflow apertures 25 is then guided down the two lateral channels 40a and 40b (FIG. 4) until it reaches the lower part of the perforating element 43. The beverage then continues downwards running along the surface of the perforating element in the vertical groove 91 (FIG. 4). As the point 92 of the perforating element extends below the lowermost part of the capsule, the beverage is guided along the surface of the piercing point 92 to its tip, and then falls straight into a cup (as shown in FIG. 2).

Figure 6D:
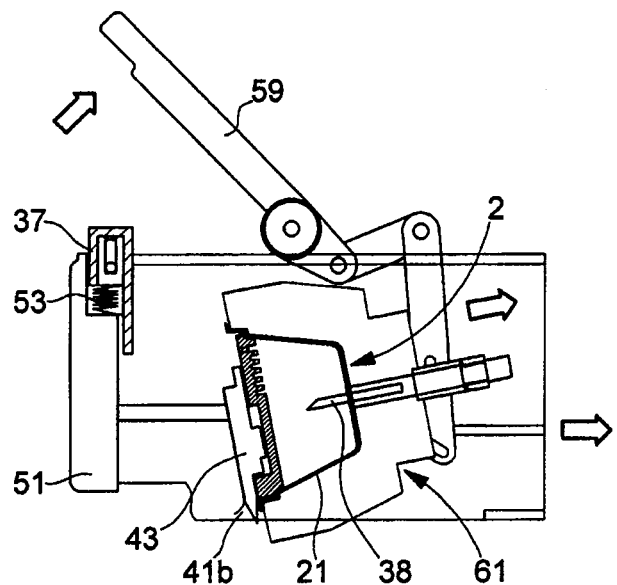
Figure 6E:
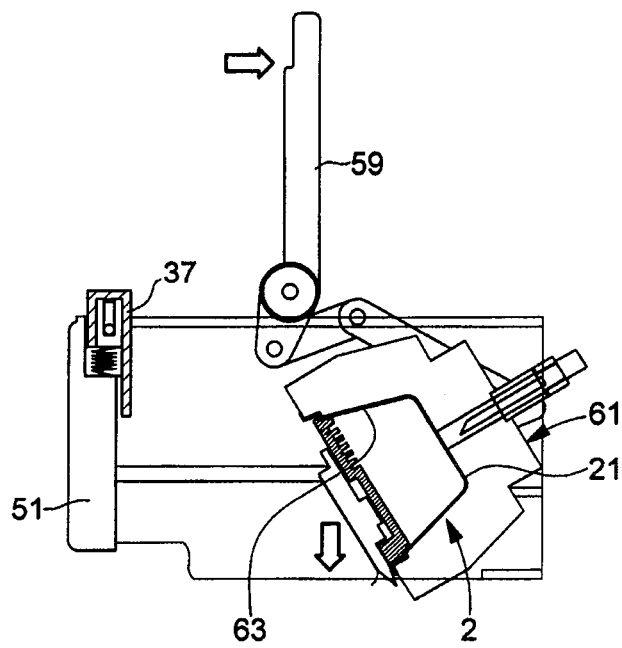

When a user of the beverage device wants to remove the used capsule, he raises the lever arm 59. Raising the lever arm releases the mechanical pusher 37, which is brought back into its rest position by the spring 53 (FIG. 6D). However, the transition from the brewing stage (FIG. 6C) to the capsule insertion state (FIG. 6E) is not simply a reversal of the closing movement. Indeed, when the movable part separates from the front plate 51, the injection member 38 does not retract, but remains in its protruding position. This is due to friction existing between the injection member 38 and the surrounding sides of the hole in the shell 21. The injection member can thus retain the capsule inside the hollow opening 63 of the movable part. The movable part 61 therefore takes the capsule 2 with it as it separates from the front plate 51.

As a user gradually turns the lever arm 59 upwards, the movable part 61 is progressively rotated relative to the horizontal plane. Furthermore, during the final transition from the stage depicted in FIG. 6D to the stage depicted in FIG. 6E, the injection member 38 finally retracts from its protruding position. The capsule 2, which was hitherto held by the frictional engagement with the injection member, comes lose of the tilted movable part. The capsule thus falls into a waist container (not shown) arranged bellow the beverage brewing device.

It should be noted that, according to an alternate embodiment, the injection member 38 can be rigidly fixed to the movable part 61, in such a way that the injection member is permanently maintained in its protruding position. According to this alternate embodiment, when the lever arm is raised, the tilting movement of the movable part 61 (FIG. 6E) causes the capsule to come loose of both the injection member 38 and the hollow opening 63.

It will be understood that various modifications and/or adaptations can be made to the embodiments described in the present description without departing from the scope of the invention defined by the annexed claims. In particular the filtering means do not need to comprise studs. The filtering means can be of any kind that a person skilled in the art would consider appropriate. In particular, the filtering means could be in the form of a traditional paper filter. The filtering means could also comprise both a paper filter and an arrangement of studs.

It should also be noted that the overflow aperture(s) can advantageously be placed above the 4/5 of the total height of the enclosure; thus ensuring a more complete submergence of the beverage ingredients and a slower evacuation of the beverage from the enclosure which favours a better infusion process.

The "total height" of the enclosure is meant to be the total distance separating the lowermost point of the enclosure to the uppermost point of the enclosure when the capsule is positioned in the beverage machine ready for the brewing operation. In a possible mode, the extension of the filtering means can be substantially equal to the total height of the enclosure.

It can be noted that a "direct flow" can be obtained where the brewed liquid is dispensed directly into the recipient 6 (e.g., cup, mug and the like). By "direct flow", it is meant that the outlet 41b is arranged in respect to the brewing device so that the brewed liquid does not encounter any permanent device or part when leaving the outlet. In other words, the outlet is placed sufficiently low and laterally spaced from the capsule handling means to avoid any significant contact of the liquid with these members when released.

The invention claimed is:

1. Capsule for the preparation of a beverage in a beverage machine comprising:
   a brewing enclosure containing one or more beverage ingredients;
   filtering means defining at least one filtering side of the brewing enclosure;
   beverage flow guiding means designed to guide the beverage to a beverage outlet of the capsule;
   a shell and a protective cover that is attached to the shell and forms with the shell a gas tight container for the beverage ingredients; and
   opening means comprising an opening element located outside the brewing enclosure and designed to open the gas-tight container in order to create the beverage outlet, the gas tight container integrally housing the beverage flow guiding means and the opening element,
   wherein the opening element is a perforating element for perforating an outlet in a wall of the gas-tight container or an element adapted to create an outlet by breaking a joint between two parts of the gas-tight container.

2. Capsule according to claim 1, comprising:
   an overflow wall that is positioned in the path of the brewed liquid after the filtering means and which comprises at least one overflow aperture.

3. Capsule according to claim 2, wherein the overflow wall and the cover face each other, and in that a portion at least of the side of the overflow wall facing the cover is designed to support the cover.

4. Capsule according to claim 2 wherein the beverage flow guiding means comprise a beverage flow channel located on a side of the overflow wall facing the cover and connecting at least one overflow aperture with the beverage outlet.

5. Capsule according to claim 2, wherein the filtering means comprise a plurality of studs protruding from a side of the overflow wall facing the enclosure.

6. Capsule according to claim 2, wherein the filtering means comprise a paper filter located between the overflow wall and the enclosure.

7. Capsule according to claim 3, wherein before the gas tight container is opened, the opening element is flush with the portion of the side of the overflow wall.

8. Capsule according to claim 4, comprising a groove formed in the side of the overflow wall facing the cover and being designed to house the opening element, and a downstream portion, at least, of the beverage flow channel joins with the groove.

9. Capsule according to claim 4 comprising an upstream portion of the beverage channel that is separate from the groove and is designed so as to avoid contact between the beverage and the one end of the opening element.

10. Capsule according to claim 8, wherein the side of the overflow wall facing the enclosure comprises a raised portion, the raised portion corresponding to a recessed portion of the side of the overflow wall facing the cover, and the recessed portion forming at least part of the groove.

11. Capsule according to claim 8, wherein the opening element is slidably disposed within the groove.

12. Capsule according to claim 1, wherein the opening element is a perforating element for perforating an outlet in a wall of the gas-tight container.

13. Capsule according to claim 12, wherein the perforating element has a generally elongated shape with two opposing ends, and the perforating element is designed to be pushed from a starting position to an "in use" position when mechanical pressure is applied onto a first opposing end, a second opposing end being designed to pierce the protective cover when the perforating element is pushed into the "in use" position.

14. Capsule according to claim 13, wherein the first opposing end is designed to be pushed by an external mechanical pusher, and in that a portion of the cover, between the mechanical pusher and the first opposing end, is designed to be pierced by the mechanical pusher.

15. Capsule according to claim 13 wherein the perforating element is designed to apply pressure onto the first opposing end causing the perforating element to slide longitudinally into the "in use" position.

16. Capsule according to claim 13 wherein the second opposing end carries a piercing point that faces a perforable zone of the cover when the perforating element is in the starting position.

17. Capsule according to claim 14, comprising a shoulder formed in the first opposing end of the perforating element, and when the mechanical pusher is activated, it applies pressure onto the shoulder.

18. Capsule according to claim 16, wherein in the "in use" position of the perforating element, the piercing point extends below the lowermost part of the capsule.

19. Capsule according to claim 1, wherein the opening element is an element adapted to create an outlet by breaking a joint between two parts of the gas-tight container.

20. A beverage machine comprising a device designed for brewing a beverage using ingredients contained in a capsule, the beverage brewing device comprising
   means for retaining the capsule in a defined position,
   first opening means for opening a hot water inlet into the capsule while the capsule is retained in the defined position,
   second opening means for opening a beverage outlet from the capsule while the capsule is retained in the defined position, and
   the retaining means and the first and second opening means are controlled by a common actuator,
   wherein the second opening means comprise a mechanical pusher located above the defined position of the capsule and designed to slide downwards when actuated.

21. A beverage machine according to claim 20, wherein in the defined position, the beverage outlet of the capsule protrudes from an underside of the brewing device so that brewed liquid does not encounter any permanent device or part when flowing down from the beverage outlet.

22. Capsule for preparing a beverage comprising:
   a brewing enclosure;
   a filter defining at least one filtering side of the brewing enclosure;
   beverage flow guide to guide the beverage to a beverage outlet of the capsule;
   a shell and a protective cover that is attached to the shell; and
   an opener comprising an opening element located outside the brewing enclosure and designed to open the container and create the beverage outlet, the container integrally housing the beverage guide and the opening element,
   wherein the opening element is a perforating element for perforating an outlet in a wall of the gas-tight container or an element adapted to create an outlet by breaking a joint between two parts of the gas-tight container.

* * * * *